United States Patent
Biswas et al.

(10) Patent No.: US 10,917,914 B2
(45) Date of Patent: *Feb. 9, 2021

(54) MEDIA ACCESS CONTROL FOR LICENSE-ASSISTED ACCESS

(71) Applicant: GUANGDONG OPPO MOBILE TELECOMMUNICATIONS CORP., LTD., Dongguan (CN)

(72) Inventors: Ashim Biswas, Sollentuna (SE); Daniel Figueiredo, Stockholm (SE); Damanjit Singh, Huddinge (SE); Oscar Zee, Stockholm (SE)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,406

(22) Filed: Jul. 24, 2019

(65) Prior Publication Data

US 2019/0349995 A1 Nov. 14, 2019

Related U.S. Application Data

(63) Continuation of application No. 15/519,577, filed as application No. PCT/SE2015/051139 on Oct. 28, 2015, now Pat. No. 10,405,349.

(Continued)

(51) Int. Cl.
*H04W 74/08* (2009.01)
*H04W 16/14* (2009.01)
(Continued)

(52) U.S. Cl.
CPC ....... *H04W 74/0816* (2013.01); *H04W 16/14* (2013.01); *H04W 74/004* (2013.01);
(Continued)

(58) Field of Classification Search
CPC ......... H04W 74/002–008; H04W 74/08–0825; H04W 74/0833–0858; H04W 74/0816;
(Continued)

(56) References Cited

U.S. PATENT DOCUMENTS 6,404,756 B1 6/2002 Whitehill et al.
2007/0002814 A1 1/2007 Benveniste
(Continued)

FOREIGN PATENT DOCUMENTS

CN 101471828 A 7/2009
CN 101552679 A 10/2009
(Continued)

OTHER PUBLICATIONS

Office Action issued in European Patent Application No. 15857755.1, dated Mar. 6, 2019; 5 pages.
(Continued)

*Primary Examiner* — Eric Myers
(74) *Attorney, Agent, or Firm* — Hodgson Russ LLP

(57) ABSTRACT

Systems and/or methods of receiving communications at a receiving node that communicates with a transmitting node over a first communication channel and a second communication channel are disclosed. The method includes receiving, at the receiving node, a request-to-send message from the transmitting node over the first communication channel, the request-to-send message indicating that the transmitting node has data to be transmitted to the receiving node over the second communication channel, determining at the receiving node whether the second communication channel is available for reception of the data, in response to determining that the second communication channel is available for reception of the data, reserving the second communica-
(Continued)

tion channel for use by the transmitting node, and receiving the data from the transmitting node over the second communication channel.

20 Claims, 9 Drawing Sheets

Related U.S. Application Data

(60) Provisional application No. 62/076,664, filed on Nov. 7, 2014.

(51) Int. Cl.
  *H04W 74/00* (2009.01)
  *H04W 84/04* (2009.01)
  *H04W 84/12* (2009.01)

(52) U.S. Cl.
  CPC ........ *H04W 74/006* (2013.01); *H04W 84/042* (2013.01); *H04W 84/12* (2013.01)

(58) Field of Classification Search
  CPC . H04W 16/14; H04W 74/004; H04W 74/006; H04W 84/042; H04W 84/12; H04W 74/0883
  See application file for complete search history.

(56) References Cited

U.S. PATENT DOCUMENTS

| | | |
|---|---|---|
| 2014/0342745 A1 | 11/2014 | Bhushan et al. |
| 2016/0128080 A1 | 5/2016 | Verma |
| 2016/0212627 A1 | 7/2016 | Venkatasubramanian |

FOREIGN PATENT DOCUMENTS

| | | |
|---|---|---|
| CN | 102098734 A | 6/2011 |
| CN | 104717750 A | 6/2015 |
| EP | 2592871 A1 | 5/2013 |
| WO | WO 2013/112983 A2 | 8/2013 |
| WO | WO 2013/174800 A1 | 11/2013 |
| WO | WO 2014/148818 A1 | 9/2014 |
| WO | WO 2014/189916 A2 | 11/2017 |

OTHER PUBLICATIONS

Alcatel-Lucent Shanghai Bell et al. "Hidden node problem and potential solutions for LAA", 3GPP Draft; R.1-144084—Hidden Node—Final, 3rd Generation Partnership Project (3GPP), Oct. 5, 2014, XP050895044, pp. 1-4.
Dappuri Bhasker et al. "IEEE 802.11 DCF MAC protocol for cognitive radio networks: Cooperative basic access Vs RTS/CTS", Sep. 24, 2014, XP032723998, pp. 45-50.
EPO, Extended European Search Report for EP Application No. 15857755.1, dated May 16, 2018.
WIPO, ISR and WO for PCT/SE2015/051139, Feb. 5, 2016.
SIPO, First Office Action for CN Application No. 201580060533.1, dated Dec. 20, 2019.
SIPO, Second Office Action for CN Application No. 201580060533.1, dated Sep. 2, 2020.
USPTO, Office Action for U.S. Appl. No. 15/519,577, dated Jun. 11, 2018.
USPTO, Office Action for U.S. Appl. No. 15/519,577, dated Dec. 28, 2018.
USPTO, Notice of Allowance for U.S. Appl. No. 16/520,649, dated Aug. 5, 2020.

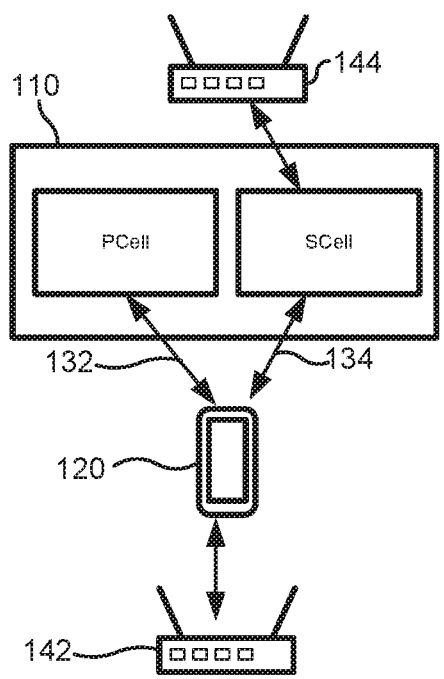
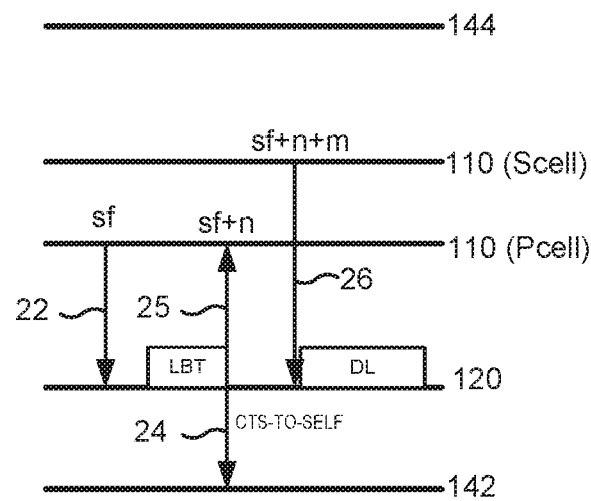
FIGURE 3A  FIGURE 3B
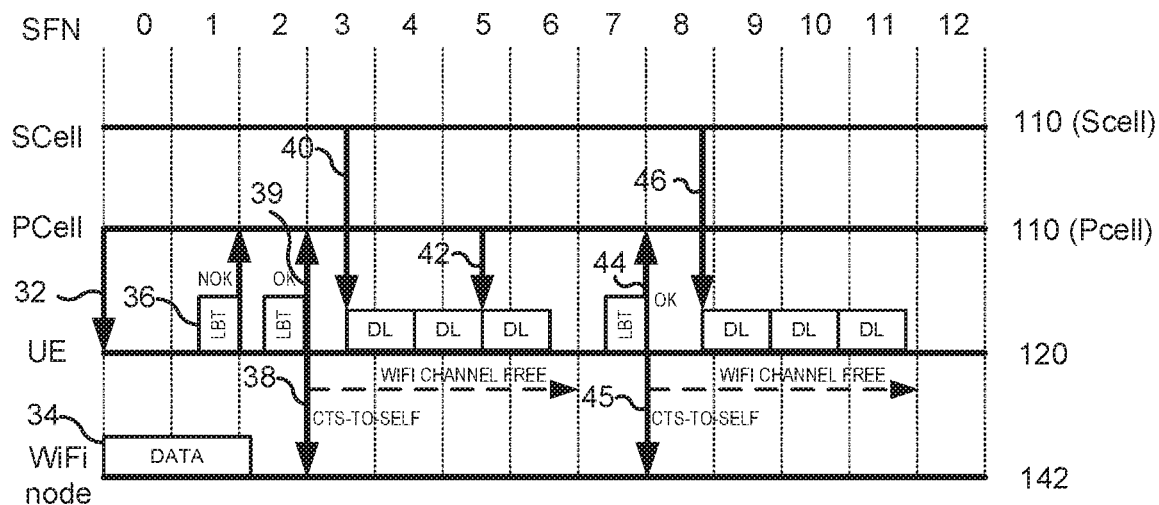
FIGURE 4

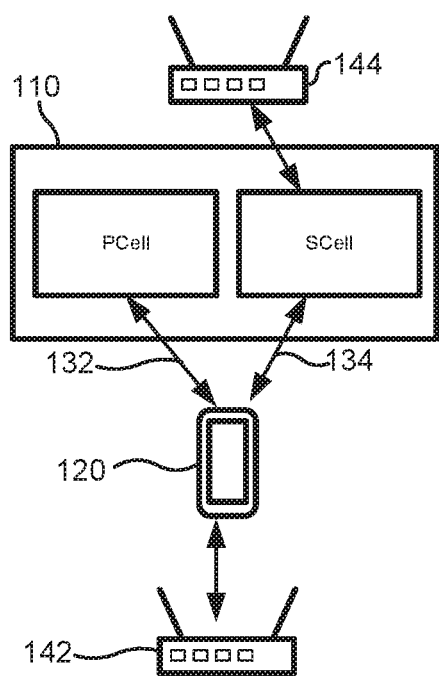 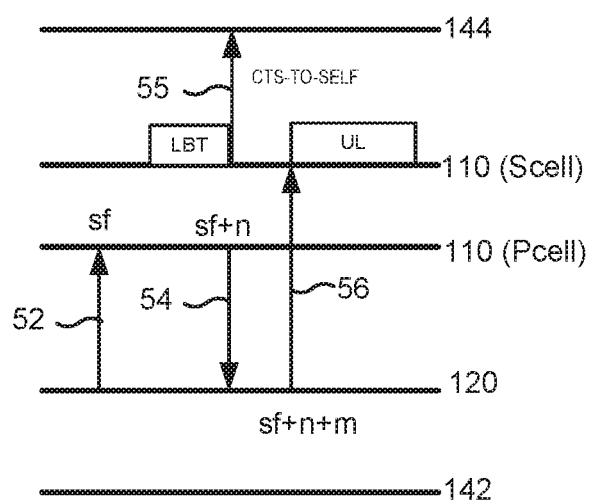
FIGURE 5A  FIGURE 5B

MEDIA ACCESS CONTROL FOR LICENSE-ASSISTED ACCESS

CLAIM OF PRIORITY

This application is a continuation of U.S. patent application Ser. No. 15/519,577, filed Apr. 17, 2017, which is a 35 U.S.C. § 371 national stage application of PCT International Application No. PCT/SE2015/051139, filed Oct. 28, 2015, which claims the benefit of and priority to U.S. Provisional Patent Application No. 62/076,664, filed Nov. 7, 2014, the disclosure and content of all of which are hereby incorporated herein by reference in their entireties.

TECHNICAL FIELD

The present disclosure is directed to communications and, more particularly, to wireless communication methods, networks, and network nodes.

BACKGROUND

License-Assisted Access via LTE (LAA-LTE) has recently been proposed as a technology to enable the cooperation of 3rd-Generation Partnership Project (3GPP) Long Term Evolution (LTE) systems on licensed carriers with unlicensed communication systems, such as wireless local area network (WLAN) communications systems.

IEEE 802.11 is a set of Media Access Control (MAC) and Physical layer (PHY) specifications for implementing WLAN computer communication in the 2.4, 3.6, 5 and 60 GHz frequency bands. The specifications are created and maintained by the IEEE Standards Committee IEEE 802. The base version of the standard was released in 1997 and has had subsequent amendments. The standard and amendments provide the basis for wireless network products using Wi-Fi.

A wireless local area network (WLAN) links two or more devices using a wireless distribution method, and may also provide a connection through an access point to another network. This gives users the ability to move around within a local coverage area and still be connected to the network. All devices that can connect to the WLAN are referred to as stations. Wireless stations fall into one of two categories: access points and clients. Access points (AP), normally routers, are base stations for the wireless network. They transmit and receive signals at radio frequencies for wireless enabled devices. Wireless clients can be mobile devices, such as laptops, personal digital assistants, IP phones and other smartphones, or fixed devices, such as desktops and workstations, that are equipped with a wireless network interface. The IEEE 802.11 standard has two basic modes of operation: an ad hoc mode and an infrastructure mode. In the ad hoc mode clients communicate directly peer-to-peer. In the infrastructure mode, clients communicate through an AP that serves as a bridge to other networks, such as the Internet or a Local Area Network (LAN) or wide area network (WAN). The following sections summarize some IEEE 802.11 characteristics.

Wi-Fi systems based on the IEEE 802.11 standards have many aspects in common with cellular systems in that they both provide orderly access to a shared wireless medium. One difference is the MAC protocol, which for cellular systems typically is scheduled, and for Wi-Fi is contention-based. This means that a receiving station does not know in advance what transmitting station it will receive data from and what transmission format that is used. The IEEE 802.11 MAC protocol is described in some more detail below.

The basic IEEE 802.11 MAC, the so-called Distributed Coordination Function (DCF), employs a Carrier Sense Multiple Access with Collision Avoidance (CSMA/CA)-based protocol. The same protocol is applied by all stations, including the APs, i.e. in both downlink and uplink transmissions. The standard also supports a Point Coordination Function (PCF) mode, in which APs have more control over the medium usage. Supporting the PCF mode is however optional, and rarely implemented.

As depicted in FIG. 1, a station using the DCF mode (User A) and wishing to transmit a frame first senses the medium. If the medium is sensed to be idle for a certain minimum time, i.e. a so-called Distributed Inter Frame Space (DIFS), the frame is transmitted. The DIFS is 50 μs in the release IEEE 802.11b. If the medium is busy, as it is for user C in FIG. 1, the station first waits until the medium is sensed idle (defer). When this occurs, the station defers the transmission during a DIFS. As an immediate transmission after the expiration of the DIFS may lead to collisions if more than one station is waiting to transmit data, each transmitting station sets a back-off timer to a random delay, and transmits only when this back-off timer has expired instead of transmitting immediately at the expiration of the DIFS. The back-off timer is only activated when the medium is sensed idle. Whenever the medium is sensed busy, a deferral state is entered in which the back-off timer is not activated. When the back-off timer expires, the frame is transmitted. If the frame is successfully received by a station, the receiving station responds with an acknowledgement to the transmitting station. The acknowledgement is sent a Short Inter Frame Space (SIFS) after the data frame is received. The SIFS is 10 μs in the release IEEE 802.11b. Since a SIFS is shorter than a DIFS, no other station will access the medium during this time. If no acknowledgement is received by the transmitting station, the transmitting station generates a new back-off timer value, and retransmits the frame when the new back-off timer has expired. The reason for not receiving any acknowledgement may be either because the transmitted frame is lost, with the result that no acknowledgement is returned, or because the acknowledgement itself is lost. Even if the frame is successfully acknowledged, the transmitting station must generate a back-off timer value and wait for it to expire before transmitting the next frame. To avoid congestion when collisions occur, back-off timer values are drawn from distributions with larger and larger expected values for every retransmission attempt. For the nth transmission attempt, the back-off timer value is drawn from the uniform distribution $U[0,\min((CW_{min})*2n-1-1, CW_{max})]$. $CW_{min}$ and $CW_{max}$ are constants with values that depend on the physical layer. For the release IEEE 802.11b the values are $CW_{min}=31$ and $CW_{max}=1023$. The back-off timer value is measured in units of slot times, which for release IEEE 802.11b are 20 us long.

In the Enhanced DCF mode, defined in the release IEEE 802.11e standard, service prioritization is introduced. This is done by using back-off and deferral parameters that depend on a service type.

Since frames are transmitted after a DIFS when the medium is free, the minimum delay is equal to the transmission time plus a DIFS, which for release IEEE 802.11b is about 1 ms for a 1500 byte frame. The almost immediate acknowledgement, with a transmission time of around 0.1 ms, means that the Round Trip Time (RTT) on layer 2 may be of the order of 1 ms.

Because of the back-off and deferral times between transmissions, the medium is not fully used even at high traffic loads. The maximum link utilization reached depends on the frame size, and varies between 50% for voice to 70-80% for data.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments provide a method of receiving communications at a receiving node that communicates with a transmitting node over a first communication channel and a second communication channel. The method includes receiving (100), at the receiving node, a request-to-send message from the transmitting node over the first communication channel, the request-to-send message indicating that the transmitting node has data to be transmitted to the receiving node over the second communication channel, determining (102, 104) at the receiving node whether the second communication channel is available for reception of the data, in response to determining that the second communication channel is available for reception of the data, reserving (106) the second communication channel for use by the transmitting node, and receiving (108) the data from the transmitting node over the second communication channel.

A potential advantage of one or more embodiments of the inventive concepts presented herein is that communications between LTE nodes can be offloaded to an unlicensed secondary communication channel while avoiding interference on the secondary communication channel.

Reserving the second communication channel may include transmitting (202) a clear-to-send-to-self message over the second communication channel.

Transmissions on the first communication channel may synchronized by subframes, and the OK-to-send signal instructing the transmitting node to send the data may be transmitted over the first communication channel in a next available subframe after transmitting the clear-to-send-to-self message over the second communication channel.

The method may further include in response to determining that the second communication channel is available for reception of the data, and transmitting (204) an OK-to-send signal to the transmitting node over the first communication channel instructing the transmitting node to send the data.

The method may further include, after receiving the data from the transmitting node, transmitting (302) an acknowledgement message from the receiving node to the transmitting node over the first communication channel.

The first communication channel may include licensed radio resources, and the second communication channel includes unlicensed radio resources.

The first communication channel may be a synchronous communication channel and the second communication channel may be an asynchronous communication channel.

The first communication channel may use a media access control (MAC) protocol in which transmission resources are scheduled, and the second communication channel may use a MAC protocol that uses a distributed control function.

Transmissions on the first communication channel may be synchronized by subframes, and determining if the second communication channel is available for reception of the data may include checking (402) if the second communication channel is free of communications at a time just before a subframe boundary.

The transmitting node may include an eNB and the receiving node may include a UE. In some embodiments, the transmitting node may include a UE and the receiving node may include an eNB.

Some embodiments provide a network node, including a processor circuit (1402, 1502), a transceiver (1420, 1520) coupled to the processor circuit, and a memory circuit (1410, 1510) including computer readable program code (1412, 1512). The computer readable code is configured to cause the processor circuit to execute the operations of receiving (100) a request-to-send message from a transmitting node over a first communication channel, the request-to-send message requesting indicating that the transmitting node has data to be transmitted to the receiving node over a second communication channel, determining (102, 104) whether the second communication channel is available for reception of the data, in response to determining that the second communication channel is available for reception of the data, reserving (106) the second communication channel for use by the transmitting node, and receiving (108) the data from the transmitting node over the second communication channel.

Some further embodiments provide a network node including a processor circuit (1402, 1502), a memory circuit (1410, 1510) coupled to the processor and including computer readable program code (1412, 1512), a transceiver (1420, 1520) coupled to the processor circuit and configured to receive (100) a request-to-send message from a transmitting node over a first communication channel, the request-to-send message requesting indicating that the transmitting node has data to be transmitted to the receiving node over a second communication channel, and to receive (108) the data from the transmitting code over the second communication channel. The computer readable program code includes a determining module (1416, 1516) for determining (102, 104) whether the second communication channel is available for reception of the data in response to the request-to-send message, and a reserving module (1418, 1518) for, in response to determining that the second communication channel is available for reception of the data, reserving (106) the second communication channel for use by the transmitting node.

Further embodiments provide a method of transmitting communications from a transmitting node to a receiving node over a first communication channel and a second communication channel. The method includes transmitting (1502), from the transmitting node, a request-to-send message over the first communication channel, the request-to-send message indicating that the transmitting node has data to be transmitted to the receiving node over the second communication channel, receiving (1504) an indication from the receiving node that the second communication channel is available for use by the transmitting node, and transmitting (1506) the data from the transmitting node to the receiving node over the second communication channel.

Receiving the indication from the receiving node that the second communication channel is available for use by the transmitting node may include receiving (1602) a clear-to-send-to-self message from the receiving node over the second communication channel.

Receiving the indication from the receiving node that the second communication channel is available for use by the transmitting node may include receiving (1702) an OK-to-send message from the receiving node over the first communication channel.

The method may further include after transmitting the data from the transmitting node, receiving (1802) an acknowledgement message from the receiving node over the first communication channel.

The communication channel may include licensed radio resources, and the second communication channel may include unlicensed radio resources.

A network node according to further embodiments includes a processor circuit (1402, 1502), a transceiver (1420, 1520) coupled to the processor circuit, and a memory circuit (1410, 1510) including computer readable program code (1412, 1512). The computer readable program code is configured to cause the processor circuit to execute the operations of transmitting (1502), from the node, a request-to-send message to a receiving node over the first communication channel, the request-to-send message indicating that the node has data to be transmitted to the receiving node over the second communication channel, receiving (1504) an indication from the receiving node that the second communication channel is available for use by the node, and transmitting (1506) the data from the node to the receiving node over the second communication channel.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 3A is a block diagram illustrating a system according to some embodiments;

FIG. 3B is a flow diagram illustrating general message flows in a system according to some embodiments;

FIG. 4 is a timing/flow diagram illustrating examples of the timing of messages in systems according to some embodiments;

FIG. 5A is a block diagram illustrating a system according to some embodiments;

FIG. 5B is a flow diagram illustrating general message flows in a system according to some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Although various embodiments are disclosed herein in the context of being performed by a UE and/or a network node, they are not limited thereto and instead can be performed in any type of electronic communication device or system.

Figure 1:
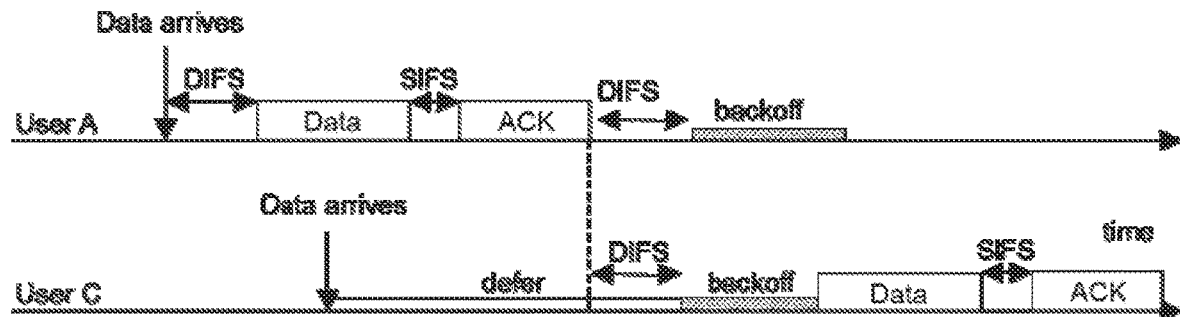
FIG. 1 is a timing diagram that illustrates media access control techniques for managing a shared medium.
Figure 2:
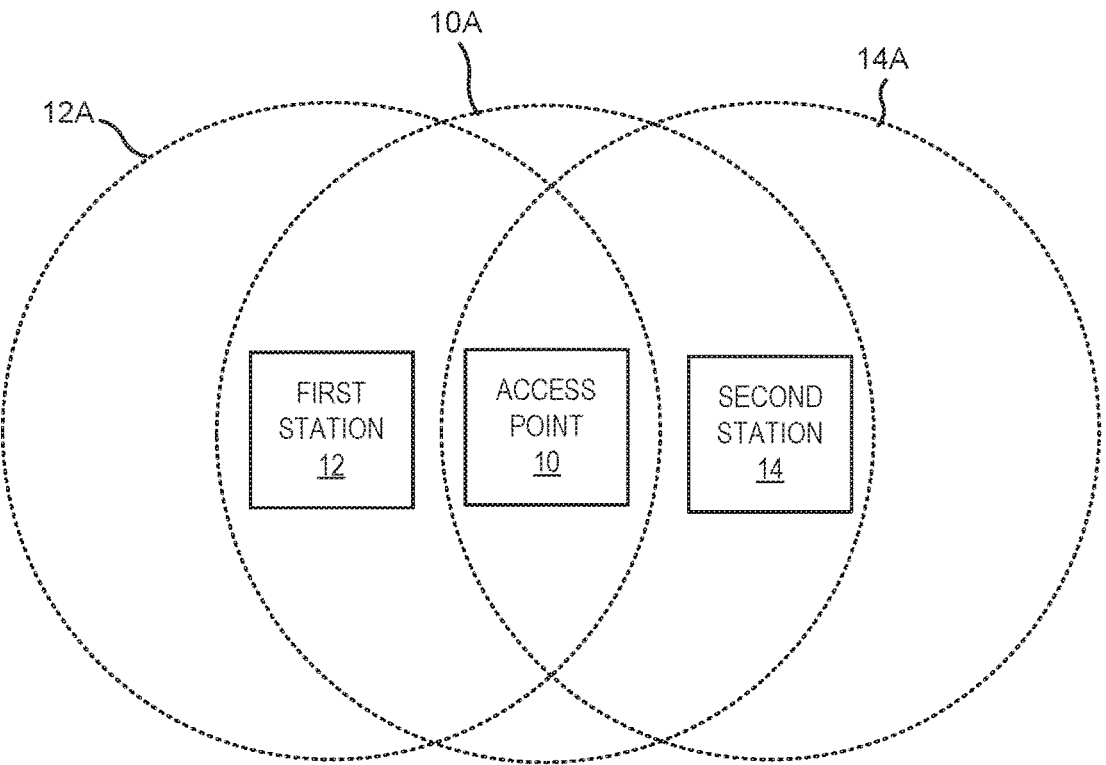
FIG. 2 is a block diagram that illustrates a problem of a hidden node in WLAN communications.

One problem that is unique to WLAN, compared to wired network, is the hidden node problem. Because the radio for each device in a WLAN network has only a limited coverage area, it is possible that a device within the network may not "hear" hidden devices that are transmitting to a device within its coverage area. FIG. 2 below illustrates this problem. In the system of FIG. 2, both a first station 12 and a second station 14 may communicate over a wireless LAN with an access point 10, which may, for example, be a wireless base station. However, the first and second stations 12, 14 are outside each other's coverage area, which means that the first station cannot receive transmissions from the second station, and vice versa. Thus, the first station 12 and the second station 14 are hidden from one another. A collision will occur if the first station 12 and the second station 14 transmit data to the access point 10 at the same time.

A solution to this problem is use a RTS (Request To Send)-CTS (Clear To Send) protocol for transmission. For example, referring to FIG. 2, when the first station 12 wants to transmit data to the access point 10, the first station 12 may transmit a RTS signal, and all stations within the coverage area 12A of the first station 12 will avoid transmission until the data transmission (data+ACK) is finished. The transmission avoidance time may be available as parameter within the RTS signal. Note, however that the second station 14 is not within the coverage area 12A of the first station 12, and therefore will not receive the RTS signal.

After reception of the RTS, the access point 10 may transmit a CTS, and all devices within coverage area 10A of the access point 10 (including the second station 14) will avoid transmission until the data transmission (data+ACK) is finished. This transmission avoidance time may be available as parameter within the CTS signal.

The first station 12 then transmits data to the access point 10, and the access point 10 acknowledges the data by transmitting an ACK signal to the first station 12.

License Assisted Access LTE (LAA-LTE)

LAA-LTE is an evolving standard under the umbrella of 3GPP. LAA-LTE proposes to use unlicensed bands (e.g. 2.4 GHz and 5.1 GHz) for LTE or LTE-like transmission, while co-existing with other wireless standards, such as WLAN IEEE 802.11 and Bluetooth. The primary channel of LTE in the licensed band may still be used, and the secondary channel(s) in the unlicensed band may be used to boost the throughput to the user. However, most of these unlicensed bands may be used by WLAN networks, which can significantly reduce the use of LTE in these bands. LTE transmissions in an unlicensed band can also become impaired without a co-existence protocol that limits interference in the unlicensed band. In particular, in the 5 GHz unlicensed band, there are many channels available that can be used for LTE transmission if a suitable protocol is used.

LTE and WLAN Compared

WLAN transmissions are asynchronous when compared to LTE, because WLAN transmissions can happen at any time the channel is free, while LTE transmissions are aligned to the Transmission Time Interval (TTI) of 1 ms. Also, the duration of WLAN transmissions is variable, while the duration of a transmission of LTE signals is in multiples of the TTI.

A feature than can be potentially useful in LAA-LTE, and that is different from WLAN communications, is that the fact the licensed carrier can be used to transmit control channel information (such as grants), ACK signals, etc., while data may be offloaded to the secondary channel when it is free. This can potentially allow more users to use the licensed spectrum, which may reduce latency and/or result in fewer link drops. In addition, the licensed channel may be more reliable than the unlicensed channel, and therefore may be more suitable for carrying control channel information, ACKs, etc., This may avoid loss of control signal information due to collisions and interference in the unlicensed spectrum. Loss of control signal information can degrade the performance of the system in terms of link drops, lost data, etc.

Listen-Before-Talk (LBT)

Listen-Before-Talk (LBT) is a protocol in which the wireless medium in the desired channel is sensed for the presence of energy, such as due to WLAN transmissions, before the medium is used to transmit data. If the medium is found to be free, then the transmitter can start using the medium. This potentially avoids collision with other devices from the same class or other (such as Bluetooth communications, or even interference from a microwave oven which operates on a frequency of 2.4 GHz). The IEEE 802.11 standard uses CSMA/CA as mentioned above. This approach, along with DCF (mentioned above), forms a powerful way of avoiding collisions and increasing throughput. However, because of alignment requirements, LBT is usually done at the transmitter side.

Even when LBT is used, the hidden node problem depicted in FIG. 2 can also affect LAA-LTE if the medium is not sensed properly. Some embodiments described herein perform LBT at the receiver (instead of at the transmitter as the name suggests), and inform the transmitter in a reasonably short time given LTE constraints that the medium is available for transmission.

In the unlicensed spectrum used in LAA-LTE, interference to the unlicensed carrier will likely originate from WLAN communications. As LTE transmission is synchronous, it will be difficult to guarantee an interference free environment on the receiver side when there are interfering WLAN devices in the neighborhood. Furthermore, the effect of interference is at the receiver, but most existing solutions listen to the medium at the transmitter assuming the interfering signal is received at the transmitter will affect the receiver equally. This assumption is may not be true unless the transmitter and receiver are co-located, which is unusual.

The main reason for LBT to be performed at the transmitter end is because of the delay in LTE between the time a decision to transmit/receive is made by the eNB (i.e., the base station) and the time of the actual on-air transmission. By performing LBT at the eNB side, this delay is to some extent avoided, but may lead to the hidden node problem described above.

Embodiments of the present disclosure may overcome one or more of the potential problems explained above with existing approaches by performing LBT on the secondary channel at the receiver side, and communicating the availability of the secondary channel to the transmitter.

In particular embodiments, a transmitting node may send a request-to-send message to a receiving node over a primary communication channel, such as a licensed LTE channel. The request-to-send message requests permission to transmit data to the receiving node over a secondary communication channel, such as an unlicensed WLAN channel.

Using receiver-side LBT, the receiving node determines if the secondary communication channel is available for reception of the data, and in response to determining that the secondary communication channel is available, transmits a clear-to-send-to-self message over the secondary communication channel. The transmitting node then transmits the data to the receiving node over the secondary communication channel.

Another problem when considering how to make LTE cooperate with asynchronous communications channels is that, since LTE transmissions cannot happen before a TTI boundary, sensing of the secondary channel medium is not very useful if it is done at beginning of the TTI and the secondary channel is reserved (e.g. via DCF) for the remainder of the TTI. This will reduce the spectrum availability, since the secondary channel will be not used for the most part. Therefore, according to some embodiments, the secondary channel may be sensed just before the transmission to reduce wastage of spectrum.

Operations and methods according to some embodiments are illustrated in FIGS. 3A and 3B. FIG. 3A is a block diagram illustrating an operating environment including an eNodeB (or eNB) base station 110 that communicates with a UE 120. The eNB 110 is configured to communicate with the UE 120 on a primary channel 132 that may utilize a licensed carrier frequency and a secondary channel 134 that may utilize an unlicensed carrier frequency. For example, the primary channel 132 may utilize LTE standards, while the secondary channel 134 may utilize WLAN standards. The WLAN environment may include a first node 142 that is outside the range of, and therefore hidden from, the eNB 110, and a second node 144 that is outside the range of, and therefore hidden from, the UE 120. The first and second nodes 142, 144 may include base stations and/or mobile stations.

The eNB 110 may be considered to comprise a primary cell (PCell) that communicates using the primary channel on the licensed carrier and a secondary cell (SCell) that communicates using the secondary channel on the unlicensed carrier. For example, the PCell may implement LTE functionality using licensed carriers, while the SCell implements WiFi functionality using unlicensed carriers. However, the inventive concepts are not limited to LTE and WiFi systems.

FIG. 3B is a flow diagram illustrating general message flows between the UE 120, the SCell of the eNB 110, the PCell of the eNB 110, and the first and second WLAN nodes 142, 144 according to some embodiments. Referring to FIGS. 3A and 3B, some embodiments operate as follows:

1. First, a ready-to-transmit-data signal 22 is sent from the PCell of the eNB 110 to the UE 120 in an first subframe sf of the primary system to indicate that the eNB 110 has data to send to the UE 120. The ready-to-transmit-data signal 22 may be a newly defined signal in LTE, or it may be an extension of an existing LTE signal. In some embodiments, the ready-to-transmit-data signal 22 may be sent via a control channel on the primary channel 132.

2. The UE 120 performs a Listen-Before-Talk (LBT) operation to determine if the secondary channel is available for reception of data. The LBT operation may be performed just before a sub-frame boundary on the primary channel 132 so that the status of the secondary channel can be communicated to the eNB 110 in the next opportunity via the primary channel 132.

3. When the secondary channel is free for reception, the UE 120 will immediately transmit a CTS-to-self message 24 over the secondary channel. The CTS-to-self message 24 will be received by the SCell of the eNB 110 as well as by the node 142 that is hidden from the SCell of the eNB 110. The UE 120 may optionally transmit a signal 25 via a control channel on the primary channel to the eNB 110 in the next available subframe (sf+n) to inform the eNB 110 that the secondary channel is available to be used. In some embodiments, the signal 25 may not be used, as the eNB 110 may interpret the CTS-to-self message 24 as an indication that the secondary channel is available. However, in some embodiments, the eNB 110 may not have an active receiver listening to the secondary channel and thus may not receive the CTS-to-self message.

In addition, the eNB 110 may not receive the CTS-to-self message 24 due to the relative unreliability of the unlicensed spectrum that carries the secondary channel. For example, there can be a case in which the UE 120 experiences a clean secondary channel, but the eNB 110 is being disturbed by interference from a hidden node, such that the CTS-to-self message transmitted by the UE 120 is not received by the eNB 110.

The CTS-to-self message is a protection mechanism that may be used in a WLAN system to protect transmitted frames from collision. When a CTS-to-self message is transmitted on a shared channel by a wireless device, the other devices using the shared channel may refrain from transmitting data on the shared channel for a defined period of time to allow the wireless device sufficient time to send data. Accordingly, when the UE 120 transmits the CTS-to-self message, other nodes using the secondary channel may wait to transmit, insuring that the secondary channel is (at least temporarily) available for the eNB 110 to send data to the UE 120.

4. After receiving the control signal 25 or the CTS-to-self message 24 from the UE 120, the eNB transmits downlink (DL) data 26 to the UE 120 over the secondary channel 134. As the air interface is cleared in the receiver side, and acknowledgment of data is done on the licensed carrier, there may be no need to perform the LBT function on the transmitter side. However, LBT may optionally be performed on the transmitter side in order to avoid disturbance to neighboring devices.

As noted above, after receiving the ready-to-transmit-data signal 22 from the transmitting node, the receiving node may wait to perform the LBT function until just before a subframe boundary in order to utilize the secondary channel more efficiently. Accordingly, a shift of timing between the primary channel and the secondary channel may be implemented so that the delay between the LBT status and the actual transmission by the transmitting node is reduced.

According to some embodiments, transmission over the secondary channel may be performed more efficiently, as the interference is cleared only on the receiver side where the interference is actually experienced rather than on the transmitter side. This approach may address problems associated with obtaining access to an unlicensed spectrum that is shared with other devices, such as WLAN devices, that are due to synchronous transmission in the LTE system.

FIG. 4 is a timing/flow diagram illustrating an example of the timing of messages between the UE 120, the SCell of the eNB 110, and the PCell of the eNB 110 of FIG. 3A according to some embodiments. In particular, FIG. 4 illustrates an example of securing a secondary channel for data transmission on the downlink (i.e. the eNB to UE direction).

First, an eNB 110 that has data to transmit to UE 110 will send a ready-to-transmit-data signal 32 at the beginning of a subframe (e.g., subframe 0) to the UE 120 using a control channel on the primary channel 132. The eNB can transmit this indication by, for example, an extension of a current uplink grant signal or a new downlink scheduling request.

After the UE 120 receives the ready-to-transmit-data signal 32, the UE 120 may perform an LBT operation 36 in the subsequent subframe (e.g., SF 1). That is, the UE 120 may monitor the secondary channel 134 to determine if it is available. In this example, the result is not OK, as a hidden node 142 in the SCell is transmitting data signals 34 that would interfere with the UE's receiver.

Accordingly, in this example, the UE 120 transmits a NOK signal via the primary channel 132 to indicate that the secondary channel is occupied, as seen from the UE 120.

In the next subframe (SF 2), the UE 120 tries to perform LBT again, and this time the result is OK as no interfering transmitter is seen by the UE 120.

The UE 120 then transmits an OK-to-send signal 39 via the primary channel 132 to indicate that the secondary channel is free, as seen from the UE 120. The UE 120 also sends a Wi-Fi CTS-to-self signal 38 in order to reserve the secondary channel.

Next, the eNB 110 transmits downlink (DL) data 40 on the secondary channel 134. The probability of successful transmission will be increased as the UE 120 has already reserved the secondary channel for use by the eNB 110 via the CTS-to-self signal 38.

Before the eNB 110 has finalized its transmission, the eNB 110 can indicate to the UE 110 that there are more data to transmit to the UE 120 on the secondary channel via a ready-to-transmit-data signal 42 that is the same as or similar to the ready-to-transmit-data signal 32 described above.

In response to the ready-to-transmit-data signal 32, the UE 110 again performs LBT on the secondary channel in the coming subframe. In this case the result is OK as no interfering transmitter is seen by the UE 120.

The UE 120 then transmits an OK-to-send signal 44 via the primary channel 132 to indicate that the secondary channel is free, as seen from UE 120. The UE 120 also sends a Wi-Fi CTS-to-self signal 45 in order to reserve the secondary channel for use by the eNB 110. The eNB 110 then transmits the data 46 to the UE 120 on the secondary channel 134.

Operations and methods according to some embodiments in which LBT is performed prior to transmission of data from the UE 120 to the eNB 110 through the SCell are illustrated in FIGS. 5A and 5B.

FIG. 5B is a flow diagram illustrating general message flows between the UE 120, the SCell of the eNB 110, the PCell of the eNB 110, and the first and second WLAN nodes 142, 144, shown in FIG. 5A. Referring to FIGS. 5A and 5B, some embodiments operate as follows:

1. First, a ready-to-transmit-data signal 52 is sent from the UE 120 to the eNB 110 over the primary channel 132 to indicate that the UE 120 has data to send to the eNB 110.

2. The eNB 110 performs a Listen-Before-Talk (LBT) operation on the secondary channel to determine if the secondary channel is available for reception of data. The LBT operation may be performed just before a sub-frame boundary so that the status of the secondary channel can be communicated to the UE 120 in the next opportunity via the primary channel.

3. If the secondary channel is free for reception, the eNB 110 will transmit a CTS-to-self message 55 over the secondary channel. The eNB 110 may optionally transmit a signal 54 via a control channel of the primary channel to the UE 120 in the next available subframe to inform the UE 120 that the secondary channel is available to be used. In some embodiments, the signal 54 may not be used, as the UE 120 may interpret the CTS-to-self message 55 as an indication that the secondary channel is available. However, in some embodiments, the UE 120 may not have an active receiver listening to the secondary channel and thus may not receive the CTS-to-self message.

In addition, the UE 120 may not receive the CTS-to-self message 55 due to the relative unreliability of the unlicensed spectrum that carries the secondary channel. For example, there can be a case in which the eNB 110 experiences a clean secondary channel, but the UE 120 is being disturbed by interference from a hidden node, such that the CTS-to-self message transmitted by the eNB 110 is not received by the UE 120.

4. After receiving the control signal 54 or the CTS-to-self message 55 from the eNB 110, the UE 110 transmits data 56 to the eNB 110 over the secondary channel 134. As the air interface is cleared in the receiver side, and acknowledgment of data is sent via the primary channel, there may be no need to perform the LBT function on the transmitter side. However, LBT may optionally be performed on the transmitter side in order to avoid eventual disturbance to neighboring devices.

Figure 6A:
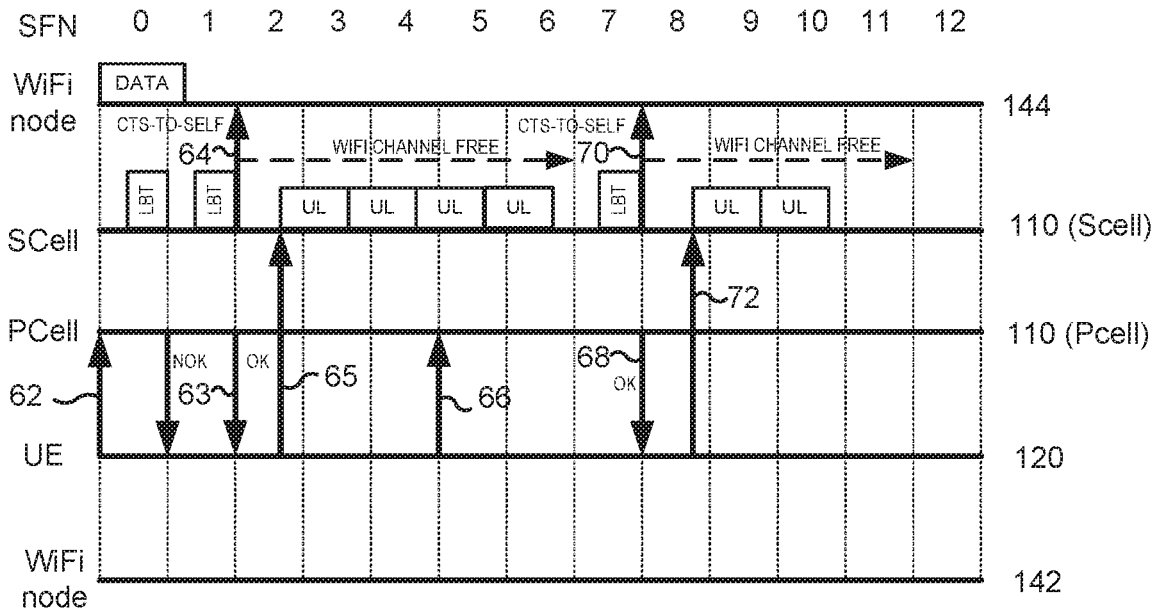
FIGS. 6A and 6B are timing/flow diagrams illustrating examples of the timing of messages in systems according to some embodiments.

FIG. 6A is a timing/flow diagram illustrating an example of the timing of messages between the UE 120, the SCell of the eNB 110, and the PCell of the eNB 110 of FIG. 5A according to some embodiments. In particular, FIG. 6A illustrates an example of using a secondary channel for data transmission on the uplink (i.e., the UE to eNB direction).

Referring to FIG. 6A, a UE 120 that has data to transmit to the eNB 110 sends a ready-to-transmit-data signal 62 to the eNB 110 using a control channel on the primary channel 132. The UE 120 can transmit this indication using, for example, an existing control signal or a new UL scheduling request.

After the eNB 110 receives the ready-to-transmit-data signal 62 on the primary channel, the eNB 110 performs LBT in the coming subframe (e.g., SF 0). In this example, however, the result is not OK as a node that is hidden from the UE 120 is transmitting and interferes with the receiver of the eNB 110.

The eNB 110 transmits a NOK signal via the primary channel to indicate that the secondary channel is occupied, as seen from the eNB 110.

In the next subframe, the eNB 110 again tries to perform LBT on the secondary channel, and this time the result is OK as no interfering transmitter is seen by the eNB 110.

The eNB 110 then transmits an OK-to-send signal 63 via the primary channel 132 to indicate that secondary channel is free, seen from eNB 110.

In addition, a Wi-Fi CTS-to-self signal 64 is sent by the eNB 110 in order to reserve the secondary channel 134.

The UE 120 then transmits data 65 on the secondary channel. The probability of successful transmission will be increased, as the eNB 110 already reserved the secondary channel 134 via the CTS-to-self signal 64.

Before the UE 120 has completed its transmission, it can indicate to the eNB 110 that there are more data to transmit to the eNB 110 over the secondary channel using another ready-to-send-data signal 66.

The eNB 110 then tries to perform LBT in the next subframe after the data transmission 65 is complete (SF 7). In this case the result is OK, as no interfering transmitter is seen by eNB 110.

The eNB 110 then transmits an OK-to-send signal 68 via the primary channel 132 to indicate that the secondary channel 134 is free, as seen from eNB 110.

The eNB 110 then sends a Wi-Fi CTS-to-self signal 70 in order to reserve the secondary channel 1343 for data transmission by the UE 120, after which the UE 120 then transmits data 72 on the secondary channel 134.

Figure 6B:
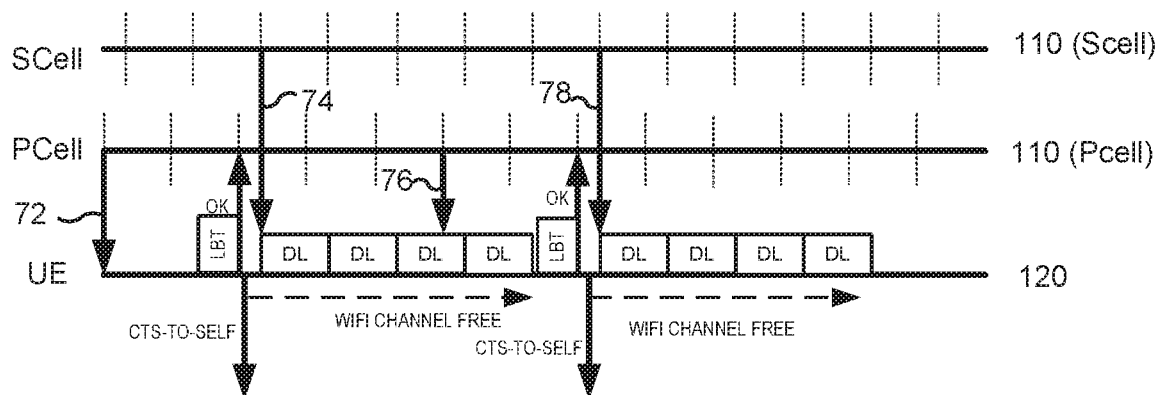

FIG. 6B illustrates an example of how time shift between the primary (licensed) channel and the secondary (unlicensed) channel can improve the usage of downlink resource. In particular, as illustrated in FIG. 6B, the subframe boundaries of the primary and secondary systems may not be aligned.

The steps shown in FIG. 6B are similar to the steps in FIG. 4, however, as shown in FIG. 6B, after receiving the ready-to-send-data signal 72, the UE 120 may wait until just before the end of the next PCell subframe to perform the LBT function, so that the SCell can begin transmission of data 74 as soon as practicable after the LBT function is performed, i.e., at the beginning of the next SCell subframe. As there is a time shift between the subframes in the PCell and the SCell, the eNB 110 can transmit data much earlier and thereby potentially save one subframe between LBT and data transmission compared to the example illustrated in FIG. 4. Similar techniques can be applied to uplink data transmission.

Continuing with the description of FIG. 6B, during the transmission of the data 74, the PCell of the eNB 110 may send another ready-to-send-data signal 76 to the UE 120. The UE 120 may perform an LBT operation during the next PCell subframe after the end of the data transmission to determine if the secondary channel 134 is available. If so, then the UE 120 can send an OK-to-send signal to the eNB 110 at the beginning of the next PCell subframe. The SCell of the eNB 110 can then begin transmitting the data 78 at the beginning of the next SCell subframe.

Figure 7:
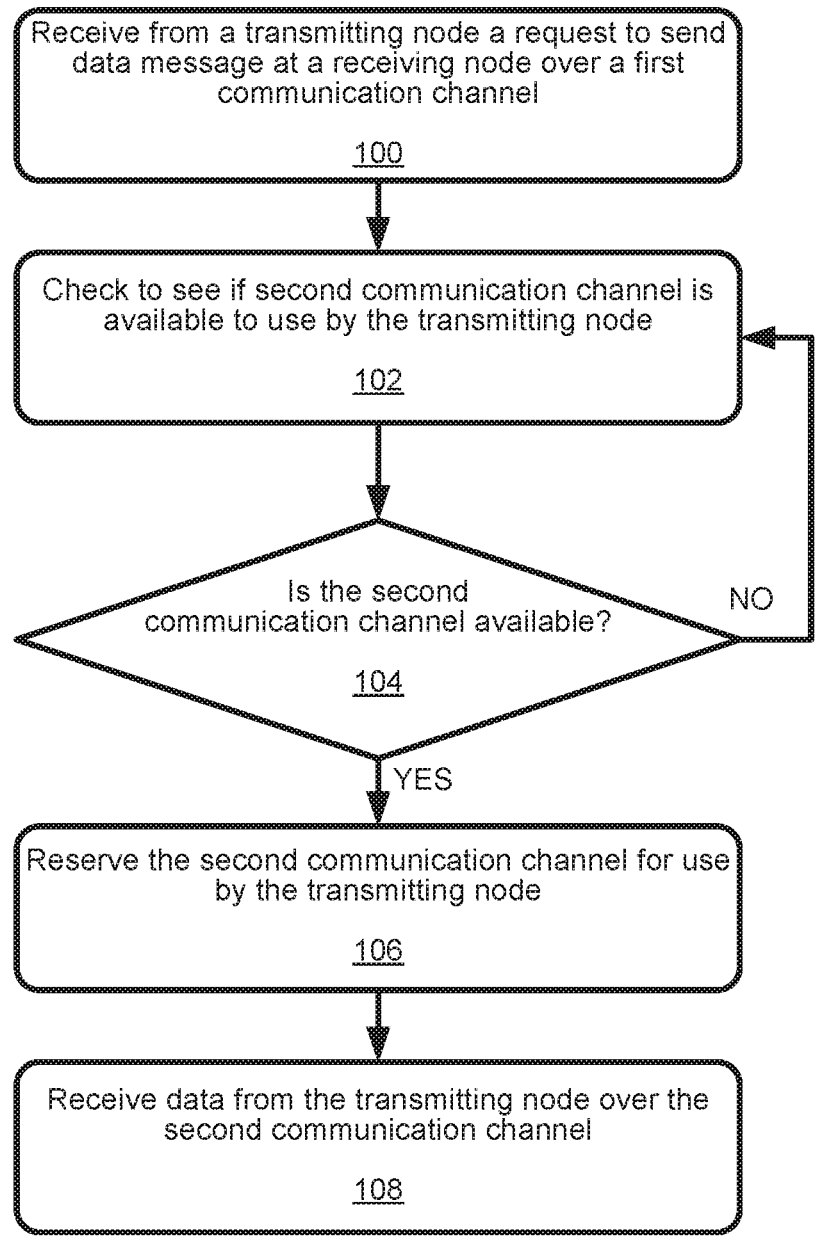
FIGS. 7, 8 9 and 10 are flowcharts of operations and methods by a receiving node configured according to some embodiments.

FIG. 7 is a flowchart illustrating operations of systems/methods according to some embodiments. In particular, FIG. 7 illustrates a method of receiving communications at a receiving node (which may, for example, be a UE or an eNB) that communicates with a transmitting node (e.g., an eNB or a UE) over a first communication channel and a second communication channel. The method includes receiving, at the receiving node, a request-to-send-data message from the transmitting node over the first communication channel (block 100). The request-to-send-data message informs the receiving node that the transmitting node has data to be transmitted to the receiving node.

The method further includes determining at the receiving node whether the second communication channel is available for reception of the data (block 102). If the second communication channel is available for reception of the data (block 104), the receiving node reserves the second communication channel for use by the transmitting node (block 106), and receives the data from the transmitting node over the second communication channel (108). If it is determined at block 104 that the second communication channel is not available for reception of the data, the operations may return to block 102 and check again to see if the second communication channel is available for reception of the data.

Figure 8:
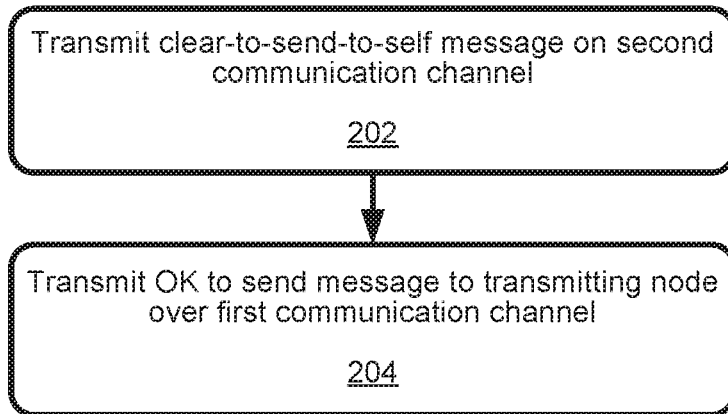

Referring to FIG. 8, reserving the second communication channel may include transmitting a clear-to-send-to-self message over the second communication channel (block 202). The receiving node may optionally transmit an OK-to-send message to the transmitting node over the first communication channel (block 204). The OK-to-send message may be transmitted over the first communication channel in a next available subframe after transmitting the clear-to-send-to-self message over the second communication channel.

Figure 9:
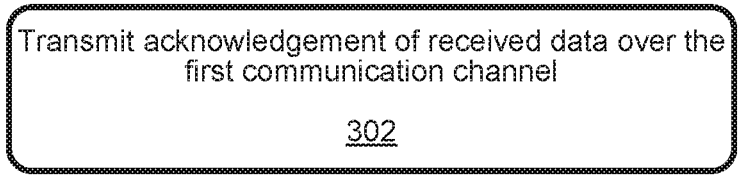

Referring to FIG. 9, the method may further include, after receiving the data from the transmitting node, transmitting an acknowledgement message from the receiving node to the transmitting node over the first communication channel (block 302).

Figure 10:
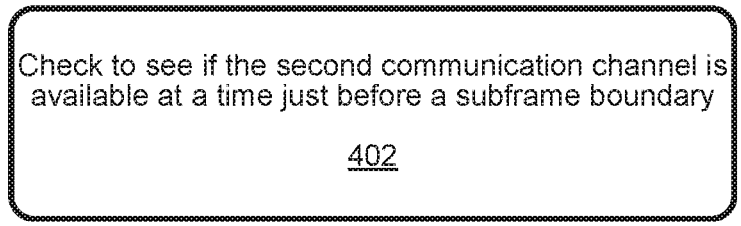

Referring to FIG. 10, determining if the second communication channel is available for reception of the data may include checking if the second communication channel is free of communications at a time just before a subframe boundary (block 402).

Example User Equipment and Network Node

Figure 11:
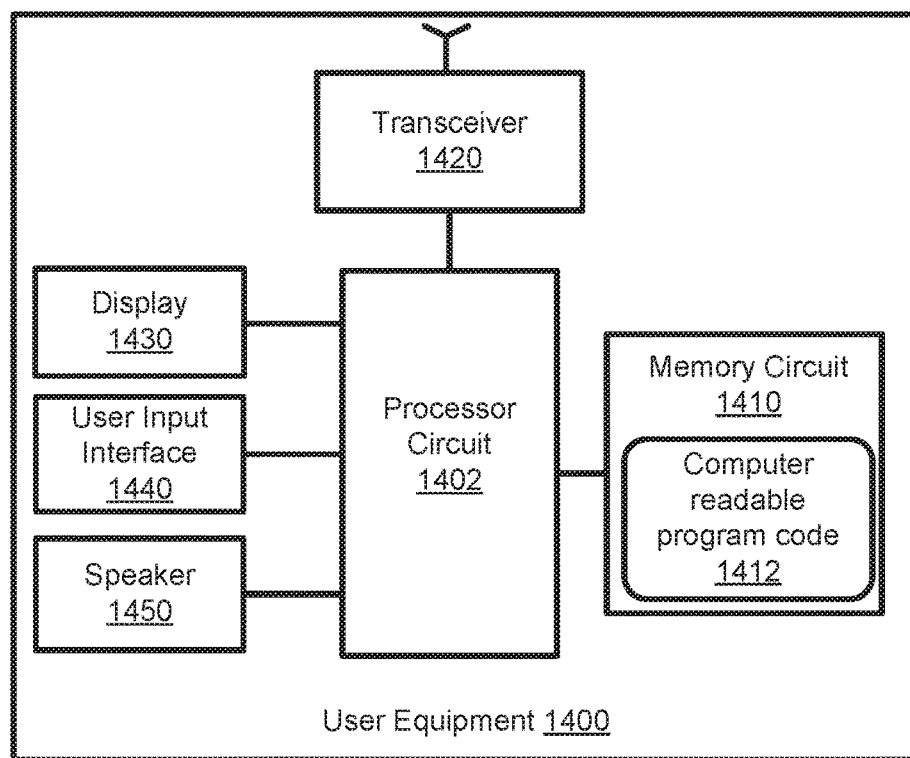
FIG. 11 is a block diagram of a UE configured according to some embodiments.

FIG. 11 is a block diagram of a UE 1400, for use in a telecommunications system, that is configured to perform operations according to one or more embodiments disclosed herein. The UE 1400 includes a transceiver 1420, a processor circuit 1402, and a memory circuit 1410 containing computer readable program code 1412. The UE 1400 may further include a display 1430, a user input interface 1440, and a speaker 1450.

The transceiver 1420 is configured to communicate with a network node, the example of which is an eNB, through a wireless air interface using one or more of the radio access technologies disclosed herein. The processor circuit 1402 may include one or more data processing circuits, such as a general purpose and/or special purpose processor, e.g., microprocessor and/or digital signal processor. The processor circuit 1402 is configured to execute the computer readable program code 1412 in the memory circuit 1410 to perform at least some of the operations described herein as being performed by a UE.

Figure 12:
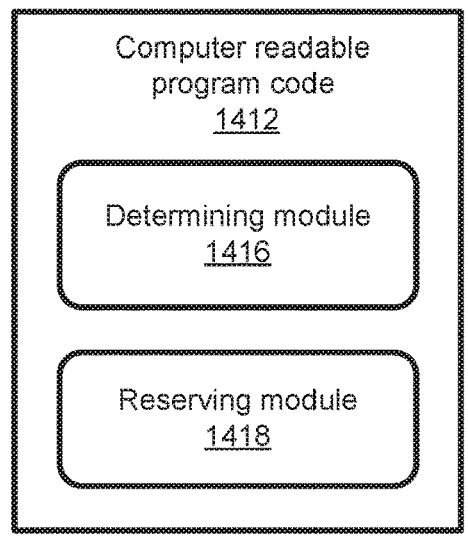
FIG. 12 is a block diagram illustrating functional modules of a UE configured according to some embodiments.

FIG. 12 illustrates the computer readable program code 1412 in more detail. In particular, the computer readable program code 1412 includes a determining module 1416 for determining whether the second communication channel is available for reception of the data in response to the request-to-send message, and a reserving module 1418 for, in response to determining that the second communication channel is available for reception of the data, reserving the second communication channel for use by a transmitting node.

Figure 13:
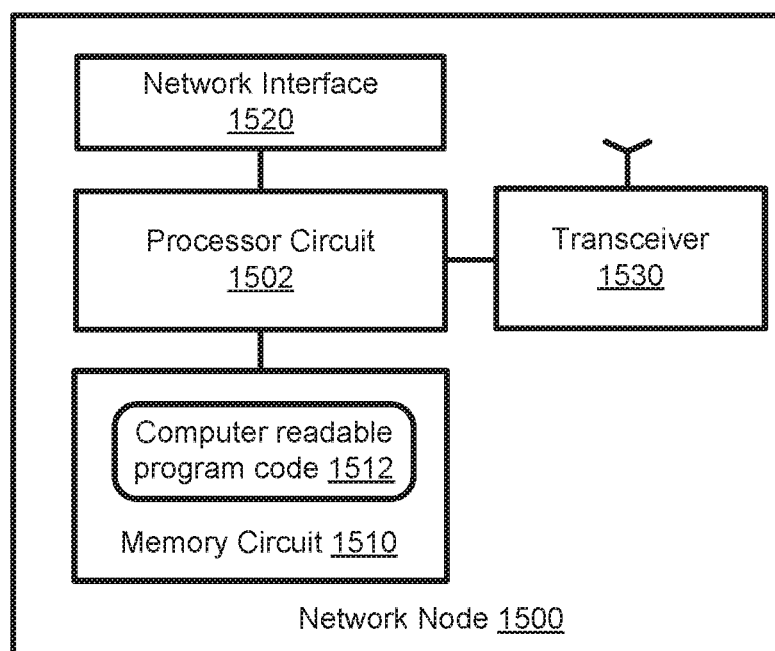
FIG. 13 is a block diagram of a network node configured according to some embodiments.

FIG. 13 is a block diagram of a network node 1500, for use in a telecommunications system, that is configured according to one or more embodiments disclosed herein for an eNB, radio network node, or other network node. The network node 1500 can include a transceiver 1530, a network interface 1520, a processor circuit 1502, and a memory circuit 1510 containing computer readable program code 1512.

The transceiver 1530 is configured to communicate with the UE 1400 using one or more of the radio access technologies disclosed herein, when the network node 1500 is a radio network node. The processor circuit 1502 may include one or more data processing circuits, such as a general purpose and/or special purpose processor, e.g., microprocessor and/or digital signal processor, that may be collocated or distributed across one or more networks. The processor circuit 1502 is configured to execute the computer readable program code 1512 in the memory 1510 to perform at least some of the operations and methods of described herein as being performed by a network node. The network interface 1520 communicates with other network nodes and/or a core network.

Figure 14:
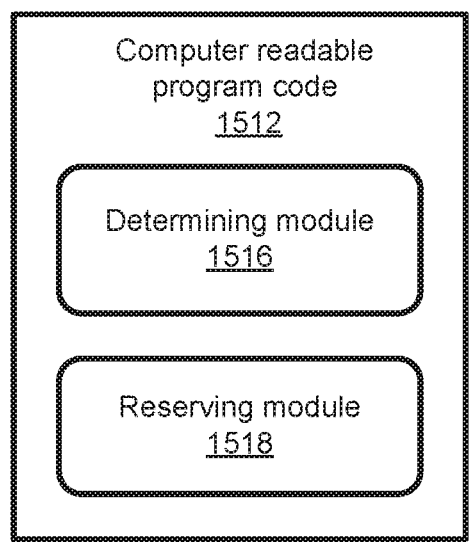
FIG. 14 is a block diagram illustrating functional modules of a network node configured according to some embodiments.

FIG. 14 illustrates the computer readable program code 1512 in more detail. In particular, the computer readable program code 1512 includes a determining module 1516 for determining whether the second communication channel is available for reception of the data in response to the request-to-send message, and a reserving module 1518 for, in response to determining that the second communication channel is available for reception of the data, reserving the second communication channel for use by a transmitting node.

Figure 15:
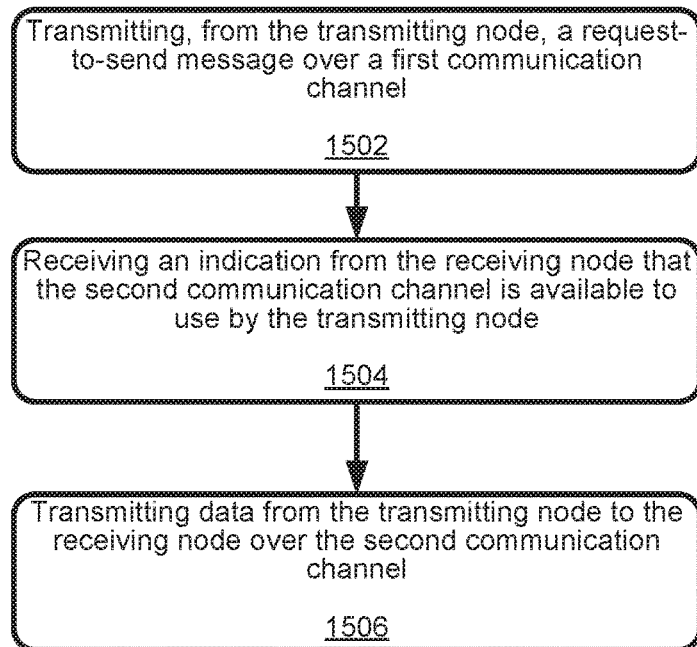
FIGS. 15, 16, 17, and 18 are flowcharts of operations and methods by a transmitting node configured according to some embodiments.

FIG. 15 illustrates systems/methods for transmitting communications from a transmitting node to a receiving node over a first communication channel and a second communication channel. The method includes transmitting, from the transmitting node, a request-to-send message over the first communication channel (block 1502). The request-to-send message indicates that the transmitting node has data to be transmitted to the receiving node over the second communication channel. The transmitting node then receives an indication from the receiving node that the second communication channel is available for use by the transmitting node (block 1504). In response to receiving the indication that the second communication channel is available for use, the transmitting node transmits the data to the receiving node over the second communication channel (block 1506).

Figure 16:
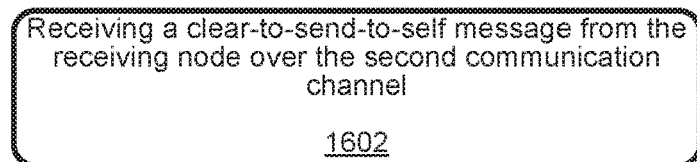

Referring to FIG. 16, in some embodiments, receiving the indication from the receiving node that the second communication channel is available for use by the transmitting node comprises receiving a clear-to-send-to-self message from the receiving node over the second communication channel (block 1602).

Figure 17:
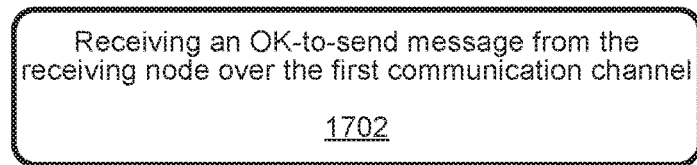

Referring to FIG. 17, in some embodiments, receiving the indication from the receiving node that the second communication channel is available for use by the transmitting node comprises receiving an OK-to-send message from the receiving node over the first communication channel (block 1702).

Figure 18:
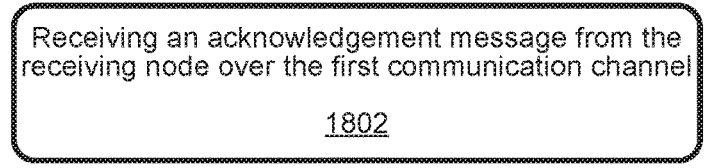

Referring to FIG. 18, the method may further include, after transmitting the data from the transmitting node, receiving an acknowledgement message from the receiving node over the first communication channel (block 1802).

Abbreviations

LTE Long-Term Evolution
LAA-LTE Licensed-Assisted Access LTE
LBT Listen Before Talk
UE User Equipment
eNB Enhanced Node conforming to 3GPP LTE standards (eNodeB)
UE User Equipment—usually and LTE client device
WLAN Wireless Local Area Network conforming to IEEE 802.11 a/g/n spec
LBT Listen-Before-Talk; a generic term for sensing wireless medium
RTS Request to Send
CTS Clear to Send DCF Distributed Co-ordination Function
UL Uplink
DL Downlink

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

EMBODIMENTS

Embodiment 1

A method of receiving communications at a receiving node that communicates with a transmitting node over a first communication channel and a second communication channel, the method comprising:

receiving (100), at the receiving node, a request-to-send message from the transmitting node over the first communication channel, the request-to-send message indicating that the transmitting node has data to be transmitted to the receiving node over the second communication channel;

determining (102, 104) at the receiving node whether the second communication channel is available for reception of the data;

in response to determining that the second communication channel is available for reception of the data, reserving (106) the second communication channel for use by the transmitting node; and receiving (108) the data from the transmitting node over the second communication channel.

Embodiment 2

The method of embodiment 1, wherein reserving the second communication channel comprises transmitting (202) a clear-to-send-to-self message over the second communication channel.

Embodiment 3

The method of embodiment 2, wherein transmissions on the first communication channel are synchronized by frames and subframes, and wherein the OK-to-send signal instructing the transmitting node to send the data is transmitted over the first communication channel in a next available subframe after transmitting the clear-to-send-to-self message over the second communication channel.

Embodiment 4

The method of any preceding embodiment, further comprising:

in response to determining that the second communication channel is available for reception of the data, transmitting (204) an OK-to-send signal to the transmitting node over the first communication channel instructing the transmitting node to send the data.

Embodiment 5

The method of any preceding embodiment, further comprising:

after receiving the data from the transmitting node, transmitting (302) an acknowledgement message from the receiving node to the transmitting node over the first communication channel.

Embodiment 6

The method of any preceding embodiment, wherein the first communication channel comprises licensed radio resources, and the second communication channel comprises unlicensed radio resources.

Embodiment 7

The method of embodiment 6, wherein the first communication channel comprises a synchronous communication channel and the second communication channel comprises an asynchronous communication channel.

Embodiment 8

The method of embodiment 7, wherein the first communication channel uses a media access control (MAC) protocol in which transmission resources are scheduled, and the second communication channel uses a MAC protocol that uses a distributed control function.

Embodiment 9

The method of embodiment 7, wherein transmissions on the first communication channel are synchronized by frames and subframes, and wherein determining if the second communication channel is available for reception of the data comprises checking (402) if the second communication channel is free of communications at a time just before a subframe boundary.

Embodiment 10

The method of any preceding embodiment, wherein the transmitting node comprises an eNB and the receiving node comprises a UE.

Embodiment 11

The method of any of embodiments 1 to 9, wherein the transmitting node comprises a UE and the receiving node comprises an eNB.

Embodiment 12

A node, comprising:
a processor circuit (1402, 1502);
a transceiver (1420, 1520) coupled to the processor circuit; and
a memory circuit (1410, 1510) comprising computer readable program code (1412, 1512) that is configured to cause the processor circuit to execute the operations of:

receiving (100) a request-to-send message from a transmitting node over a first communication channel, the request-to-send message requesting indicating that the transmitting node has data to be transmitted to the receiving node over a second communication channel;

determining (102, 104) whether the second communication channel is available for reception of the data;

in response to determining that the second communication channel is available for reception of the data, reserving (106) the second communication channel for use by the transmitting node; and receiving (108) the data from the transmitting node over the second communication channel.

Embodiment 13

A node, comprising:
a processor circuit (1402, 1502);
a memory circuit (1410, 1510) coupled to the processor and comprising computer readable program code (1412, 1512);
a transceiver (1420, 1520) coupled to the processor circuit and configured to receive (100) a request-to-send message from a transmitting node over a first communication channel, the request-to-send message requesting indicating that the transmitting node has data to be transmitted to the receiving node over a second communication channel, and to receive (108) the data from the transmitting code over the second communication channel;

wherein the computer readable program code comprises:

a determining module (1416, 1516) for determining (102, 104) whether the second communication channel is available for reception of the data in response to the request-to-send message; and a reserving module (1418, 1518) for, in response to determining that the second communication channel is available for reception of the data, reserving (106) the second communication channel for use by the transmitting node.

Embodiment 14

A method of transmitting communications from a transmitting node to a receiving node over a first communication channel and a second communication channel, the method comprising:

transmitting (1502), from the transmitting node, a request-to-send message over the first communication channel, the request-to-send message indicating that the transmitting node has data to be transmitted to the receiving node over the second communication channel;

receiving (1504) an indication from the receiving node that the second communication channel is available for use by the transmitting node; and transmitting (1506) the data from the transmitting node to the receiving node over the second communication channel.

Embodiment 15

The method of embodiment 14, wherein receiving the indication from the receiving node that the second communication channel is available for use by the transmitting node comprises receiving (1602) a clear-to-send-to-self message from the receiving node over the second communication channel.

Embodiment 16

The method of embodiment 14, wherein receiving the indication from the receiving node that the second communication channel is available for use by the transmitting node comprises receiving (1702) an OK-to-send message from the receiving node over the first communication channel.

Embodiment 17

The method of any of embodiments 14 to 16, further comprising:

after transmitting the data from the transmitting node, receiving (1802) an acknowledgement message from the receiving node over the first communication channel.

Embodiment 18

The method of any of embodiments 14 to 17, wherein the first communication channel comprises licensed radio resources, and the second communication channel comprises unlicensed radio resources.

Embodiment 19

The method of any of embodiments 14 to 18, wherein the transmitting node comprises an eNB and the receiving node comprises a UE.

Embodiment 20

The method of any of embodiments 14 to 18, wherein the transmitting node comprises a UE and the receiving node comprises an eNB.

Embodiment 21

A node, comprising:
a processor circuit (1402, 1502);
a transceiver (1420, 1520) coupled to the processor circuit; and
a memory circuit (1410, 1510) comprising computer readable program code (1412, 1512) that is configured to cause the processor circuit to execute the operations of:
transmitting (1502), from the node, a request-to-send message to a receiving node over the first communication channel, the request-to-send message indicating that the node has data to be transmitted to the receiving node over the second communication channel;
receiving (1504) an indication from the receiving node that the second communication channel is available for use by the node; and
transmitting (1506) the data from the node to the receiving node over the second communication channel.

Embodiment 22

A network node (1400, 1500) configured to perform the method of any of embodiments 1-11.

Embodiment 23

A network node (1400, 1500) configured to perform the method of any of embodiments 14-20.

The invention claimed is:

1. A first network node, comprising:
a memory comprising a computer program code; and
a processor configured to execute the computer program code to cause the first network node to:
receive a request-to-send message over a first communication channel, the request-to-send message indicating that a second network node has data to be transmitted to the first network node over a second communication channel;
in response to the request-to-send message, determine, at a time just before an end of a first subframe on the first communication channel, whether the second communication channel is available for reception of the data;
in response to determining that the second communication channel is available for the reception of the data, transmit, in a next available subframe after the first subframe, an OK-to-send signal to the second network node over the first communication channel; and
receive the data from the second network node over the second communication channel.

2. The first network node of claim 1, wherein in determining whether the second communication channel is available for the reception of the data, the processor is further configured to execute the computer program code to cause the first network node to:

perform a listen-before-talk (LBT) operation to determine whether the second communication channel is free of communications.

3. The first network node of claim 1, wherein the processor is further configured to execute the computer program code to cause the first network node to:

in response to determining that the second communication channel is available for the reception of the data, reserve the second communication channel for use by the second network node.

4. The first network node of claim 3, wherein in reserving the second communication channel, the processor is further configured to execute the computer program code to cause the first network node to:

transmit a clear-to-send-to-self message over the second communication channel.

5. The first network node of claim 1, wherein the processor is further configured to execute the computer program code to cause the first network node to:

after receiving the data from the second network node, transmit an acknowledgement message to the second network node over the first communication channel.

6. The first network node of claim 1, wherein the first communication channel comprises licensed radio resources, and the second communication channel comprises unlicensed radio resources.

7. The first network node of claim 6, wherein the first communication channel comprises a synchronous communication channel, and the second communication channel comprises an asynchronous communication channel.

8. The first network node of claim 7, wherein the first communication channel uses a media access control (MAC) protocol in which transmission resources are scheduled, and the second communication channel uses a MAC protocol that uses a distributed control function.

9. The first network node of claim 7, wherein transmissions on the first communication channel are synchronized by frames and subframes.

10. The first network node of claim 1, wherein in transmitting the OK-to-send signal to the second network node, the processor is further configured to execute the computer program code to cause the first network node to:

transmitting the OK-to-send signal via a control channel on the first communication channel.

11. The first network node of claim 1, wherein the first communication channel uses a Long-Term Evolution (LTE) standard.

12. The first network node of claim 1, wherein the second communication channel uses a Wireless Local Area Network (WLAN) standard.

13. The first network node of claim 1, wherein the first node comprises an eNodeB (eNB) and the second node comprises user equipment (UE).

14. The first network node of claim 1, wherein the first node comprises user equipment (UE) and the second node comprises an eNodeB (eNB).

15. The first network node of claim 1, further comprising: a radio transceiver coupled to the processor.

16. A method performed by a first network node, comprising:

receiving a request-to-send message over a first communication channel, the request-to-send message indicating that a second network node has data to be transmitted to the first network node over a second communication channel;

in response to the request-to-send message, determining, at a time just before an end of a first subframe on the first communication channel, whether the second communication channel is available for reception of the data;

in response to determining that the second communication channel is available for the reception of the data, transmitting, in a next available subframe after the first subframe, an OK-to-send signal to the second network node over the first communication channel; and receiving the data from the second network node over the second communication channel.

17. The method of claim 16, wherein determining whether the second communication channel is available for the reception of the data comprises:

performing a listen-before-talk (LBT) operation to determine whether the second communication channel is free of communications.

18. The method of claim 16, further comprising:

in response to determining that the second communication channel is available for the reception of the data, reserving the second communication channel for use by the second network node.

19. The method of claim 18, wherein reserving the second communication channel comprises:

transmitting a clear-to-send-to-self message over the second communication channel.

20. A non-transitory computer-readable medium comprising a computer program code that, when executed by a processor coupled to a first network node, causes the first network node to perform operations comprising:

receiving a request-to-send message over a first communication channel, the request-to-send message indicating that a second network node has data to be transmitted to the first network node over a second communication channel;

in response to the request-to-send message, determining, at a time just before an end of a first subframe on the first communication channel, whether the second communication channel is available for reception of the data;

in response to determining that the second communication channel is available for the reception of the data, transmitting, in a next available subframe after the first subframe, an OK-to-send signal to the second network node over the first communication channel; and receiving the data from the second network node over the second communication channel.

\* \* \* \* \*